(12) United States Patent
Somuah

(10) Patent No.: US 7,378,948 B2
(45) Date of Patent: May 27, 2008

(54) DIGITAL MESSAGE DISPLAY FOR VEHICLES

(76) Inventor: Eddie Somuah, 52 Milford Hunt La., Milford, CT (US) 06460

(*) Notice: Subject to any disclaimer, the term of this patent is extended or adjusted under 35 U.S.C. 154(b) by 587 days.

(21) Appl. No.: 11/038,036

(22) Filed: Jan. 21, 2005

(65) Prior Publication Data

US 2005/0134441 A1 Jun. 23, 2005

Related U.S. Application Data

(63) Continuation-in-part of application No. 10/390,711, filed on Mar. 19, 2003, now abandoned.

(51) Int. Cl.
*B60Q 1/00* (2006.01)
*G08G 1/16* (2006.01)
*G01S 13/08* (2006.01)

(52) U.S. Cl. .............. 340/436; 340/435; 340/903; 701/1; 701/301; 180/167; 180/169

(58) Field of Classification Search ................ 340/436
See application file for complete search history.

(56) References Cited

U.S. PATENT DOCUMENTS

| 4,631,516 | A | * | 12/1986 | Clinker | 340/464 |
| 4,943,796 | A | * | 7/1990 | Lee | 340/435 |
| 5,500,638 | A | | 3/1996 | George | |
| 5,734,336 | A | * | 3/1998 | Smithline | 340/903 |
| 5,825,281 | A | | 10/1998 | McCreary | |
| 5,838,228 | A | * | 11/1998 | Clark | 340/436 |
| 5,905,434 | A | | 5/1999 | Steffan | |
| 6,060,993 | A | | 5/2000 | Cohen | |
| 6,263,282 | B1 | * | 7/2001 | Vallancourt | 701/301 |
| 6,300,870 | B1 | | 10/2001 | Nelson | |
| 6,411,204 | B1 | | 6/2002 | Bloomfield et al. | |
| 6,553,285 | B1 | | 4/2003 | Bahmad | |
| 6,590,495 | B1 | * | 7/2003 | Behbehani | 340/435 |
| 2004/0183659 | A1 | * | 9/2004 | Somuah | 340/435 |

* cited by examiner

*Primary Examiner*—Donnie L Crosland
(74) *Attorney, Agent, or Firm*—Richard C. Litman

(57) ABSTRACT

The digital message display for vehicles detects a tailgater and automatically flashes a warning message, directed to the tailgater, on a message display that is located in the rear window of the vehicle in view of following traffic. In addition to the warning message directed to the tailgater, a distance display is located in view of the vehicle driver to indicate the distance of the tailgater. An audible alarm alerts the driver to the presence of the tailgater. Additionally, a wireless remote control device allows the driver to manually select and display one of a number of pre-defined safety and courtesy messages. Multiple distance sensors provide multiple functional ranges to accommodate varying driving or traffic conditions.

20 Claims, 9 Drawing Sheets

DIGITAL MESSAGE DISPLAY FOR VEHICLES

CROSS-REFERENCE TO RELATED APPLICATION

This application is a continuation-in-part of U.S. patent application Ser. No. 10/390,711, filed Mar. 19, 2003 now abandoned.

BACKGROUND OF THE INVENTION

1. Field of the Invention

The present invention relates to a digital message display for vehicles, and particularly to a digital message display for vehicles having a sensing means to detect when a trailing vehicle is following too closely for the purpose of automatically displaying a message to the trailing vehicle.

2. Description of the Related Art

Digital message displays are well known, and have been employed in advertising signs, message boards or displays often seen in bars and restaurants, and a wide variety of commercial settings. Such displays are frequently used to promote sales, upcoming special events, and the like.

Digital message displays have also been used on vehicles. Used on vehicles, these displays often show commercial messages. Also, digital message displays have been used to offer greeting and safety messages to the drivers and passengers of other vehicles. U.S. Pat. No. 5,825,281, issued on Oct. 20, 1998 to R. McCreary, describes a method of displaying advertising messages. A digital message display shows one of a number of pre-defined messages. Each time the brake pedal is depressed, the message display is changed. The display, mounted on the top or the rear of a vehicle, conveys advertising messages to other vehicles, pedestrians, and others who happen to see the vehicle.

Another system that employs a vehicle-mounted digital display for commercial and advertising purposes is detailed in U.S. Pat. No. 6,060,993, issued on May 9, 2000 to E. Cohen. This system uses a wireless communication system, along with a GPS system, to display messages on command form a base station or based on geographic relevance as the vehicle moves between different locations.

U.S. Pat. No. 5,500,638, issued on Mar. 19, 1996 to I. George, discloses a vehicular goodwill message system that is intended to issue a message on command from the operator of a vehicle. The system allows for the display of four pre-defined messages including courtesy messages such as "SORRY!" or "THANK YOU!" that may be signaled to a trailing driver, and distress messages such as "PLEASE HELP" or "PLEASE CALL 911". A control box includes a pushbutton for each message.

U.S. Pat. No. 5,905,434, issued on May 18, 1999 to P. Steffan, shows a vehicle communication device that is another example of a message display that allows the driver of a vehicle to select from a number of preset and pre-programmed messages to be displayed on a display device mounted on the exterior of the vehicle.

In addition to the commercial benefit of advertising signs, and the entertainment and courtesy value of messages that a driver might signal to a following vehicle, it is desired to use a vehicle mounted digital display to improve vehicular safety. Rear-end accidents while driving account for a significant number of all vehicle accidents. These may be caused, among numerous factors, by a driver following another vehicle too closely, or by the driver of a following vehicle simply being inattentive to the actions of the vehicle in front.

U.S. Pat. No. 6,300,870, issued on Oct. 9, 2001 to W. Nelson, discusses safety aspects in an automotive digital rear window display. The primary safety feature discussed, however, is merely that the message display may capture the attention of a following driver more quickly than conventional means such as the vehicle brake lights or the turn signals.

While the display may indeed capture the attention of the following driver, it is not helpful if the leading driver is unaware of, and therefore cannot display a message in response to, a hazardous situation such as a tailgater.

None of the above inventions and patents, taken either singly or in combination, is seen to describe the instant invention as claimed. Thus, a digital message display for vehicles solving the aforementioned problems is desired.

SUMMARY OF THE INVENTION

The digital message display for vehicles is a digital message display, to be mounted in the rear window of an automobile, capable of displaying a number of pre-defined messages. Distance measuring sensors are mounted on the automobile's rear bumper to detect and determine the distance to a following vehicle. A computer processing unit, containing a program memory, is electrically connected to the display and the sensors and will cause a pre-determined message to be displayed when a following vehicle becomes too close. The system also has a remote control that may be used to show other courtesy messages on the display. An audible alarm and a distance display provide information to the vehicle's driver about the presence of, and the distance of, the trailing vehicle. The warning that is automatically issued to the following driver, along with the alert and distance information presented to the vehicle's driver, enhance safety and help to prevent a rear-end collision.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1A:
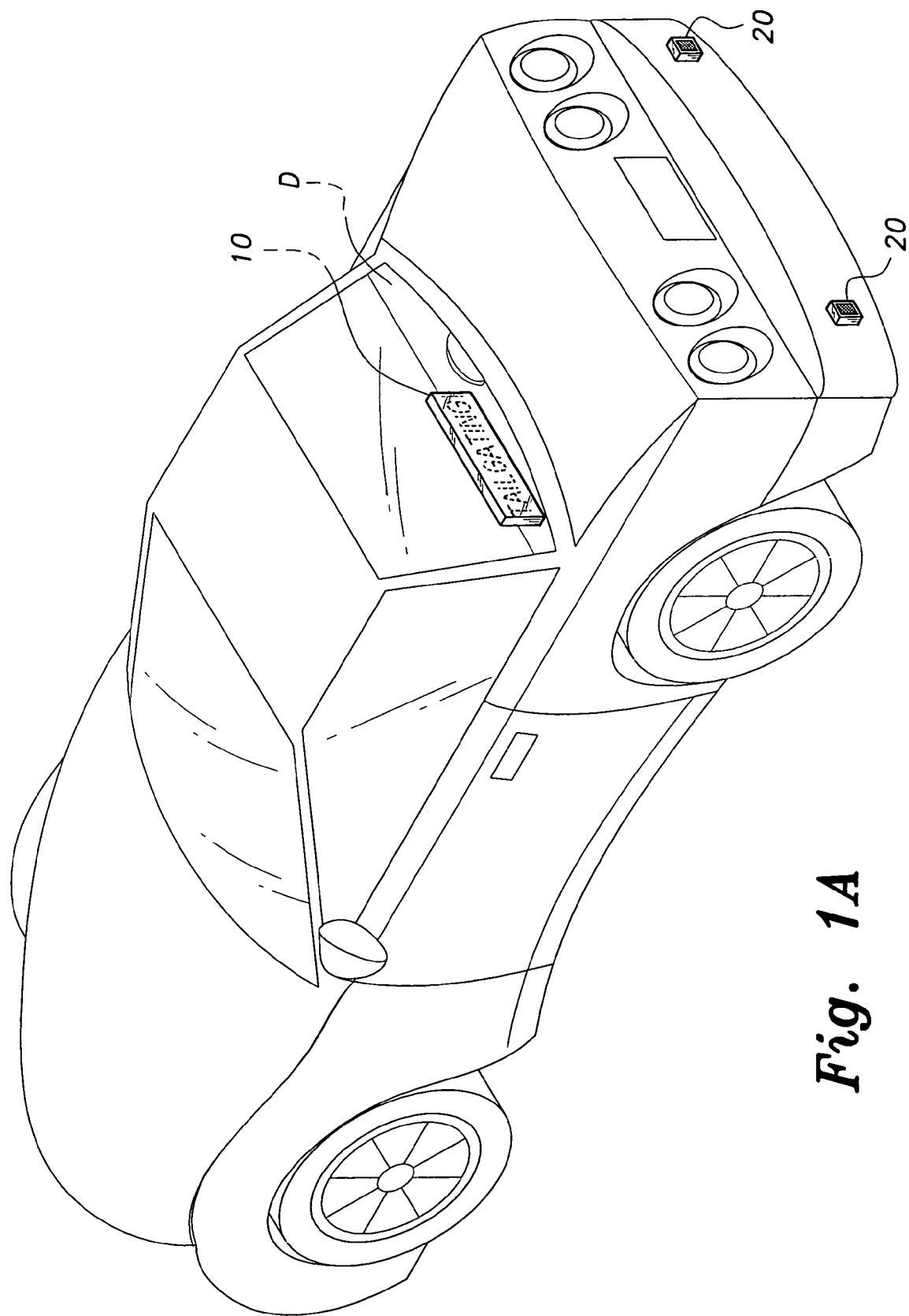
FIG. 1A is an environmental, perspective view of a digital message display for vehicles according to the present invention.

The present invention is a digital message display for vehicles. The digital message display for vehicles is a vehicle safety device that displays a warning message on a message display 10 when a tailgating vehicle is detected by distance sensors 20. FIG. 1A shows a digital message display for vehicles incorporating a message display 10, disposed in a vehicle's rear window in view of following vehicles, and a first pair of distance sensors 20 mounted on the vehicle's rear bumper.

Figure 1B:
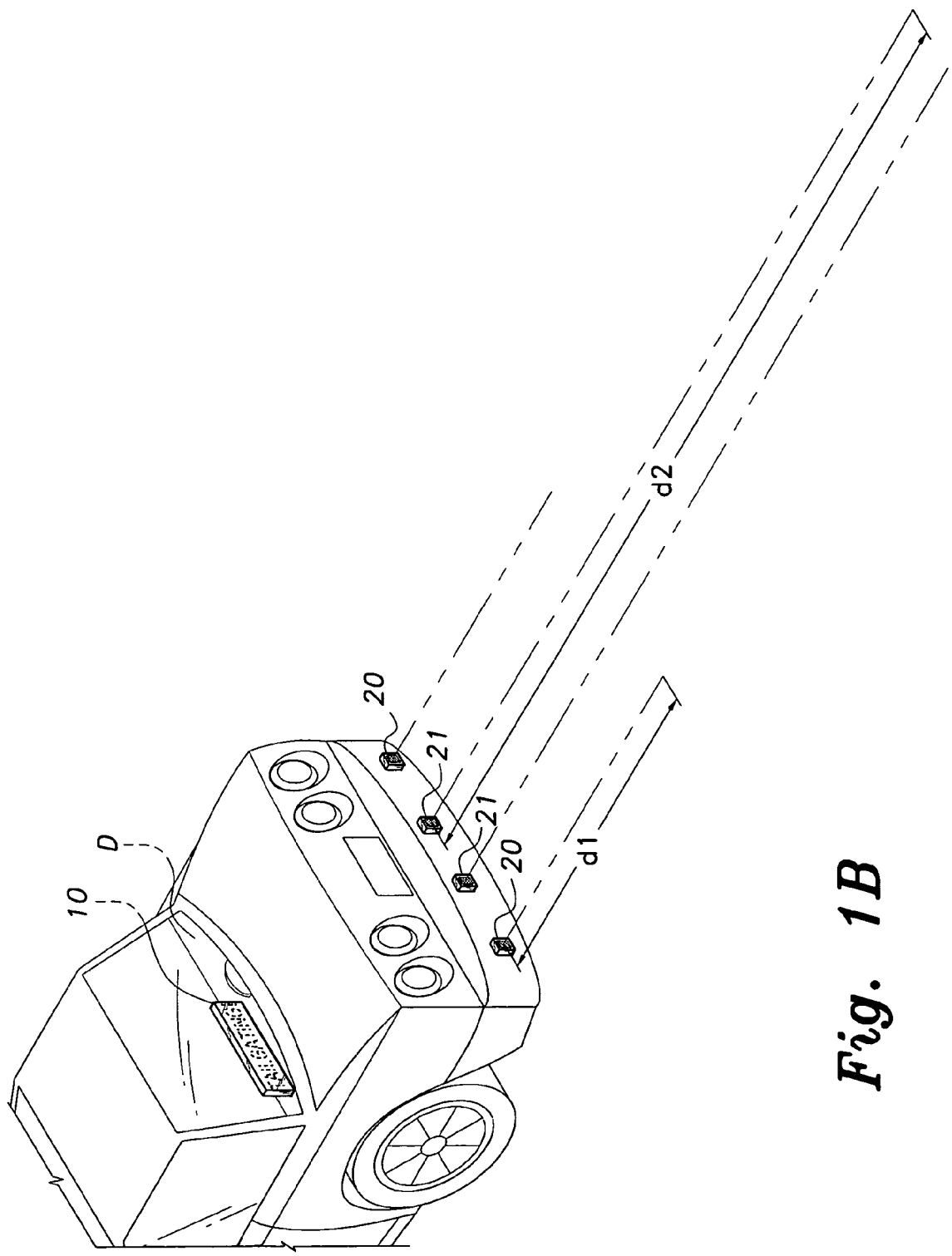
FIG. 1B is an environmental, perspective view of a digital message display for vehicles according to a second embodiment of the present invention.

Referring to FIG. 1B, a second pair of distance sensors 21 are added. In the embodiment shown in FIG. 1B, the first pair of distance sensors 20 and the second pair of distance sensors 21 are each configured to sense trailing vehicles at a different range, either by characteristic of the sensors or by software compensation. As illustrated, the first pair of distance sensors 20 are configured to sense trailing vehicles in the vicinity of a close range distance d1, while the second pair of distance sensors 21 are configured sense trailing vehicles in the vicinity of a long range distance d2. In one configuration, a short range distance d1 may be about three (3) meters, in conjunction with a long range distance of about ten (10) meters, although it can be recognized that other distances may be employed as well.

By employing the first and second pairs of distance sensors 20, 21, each configured for a different range, the digital message display for vehicles may be responsive to trailing vehicles at multiple distance thresholds to provide a first general warning message (in the vicinity of the long range distance d2), and a second more urgent warning message (in the vicinity of the short range distance d1). Additionally, the digital message display for vehicles may provide different thresholds to illuminate a warning message at slow driving speeds (where a closer trailing distance is tolerated) or at high driving speeds (where a greater trailing distance is required for safety).

Figure 2A:
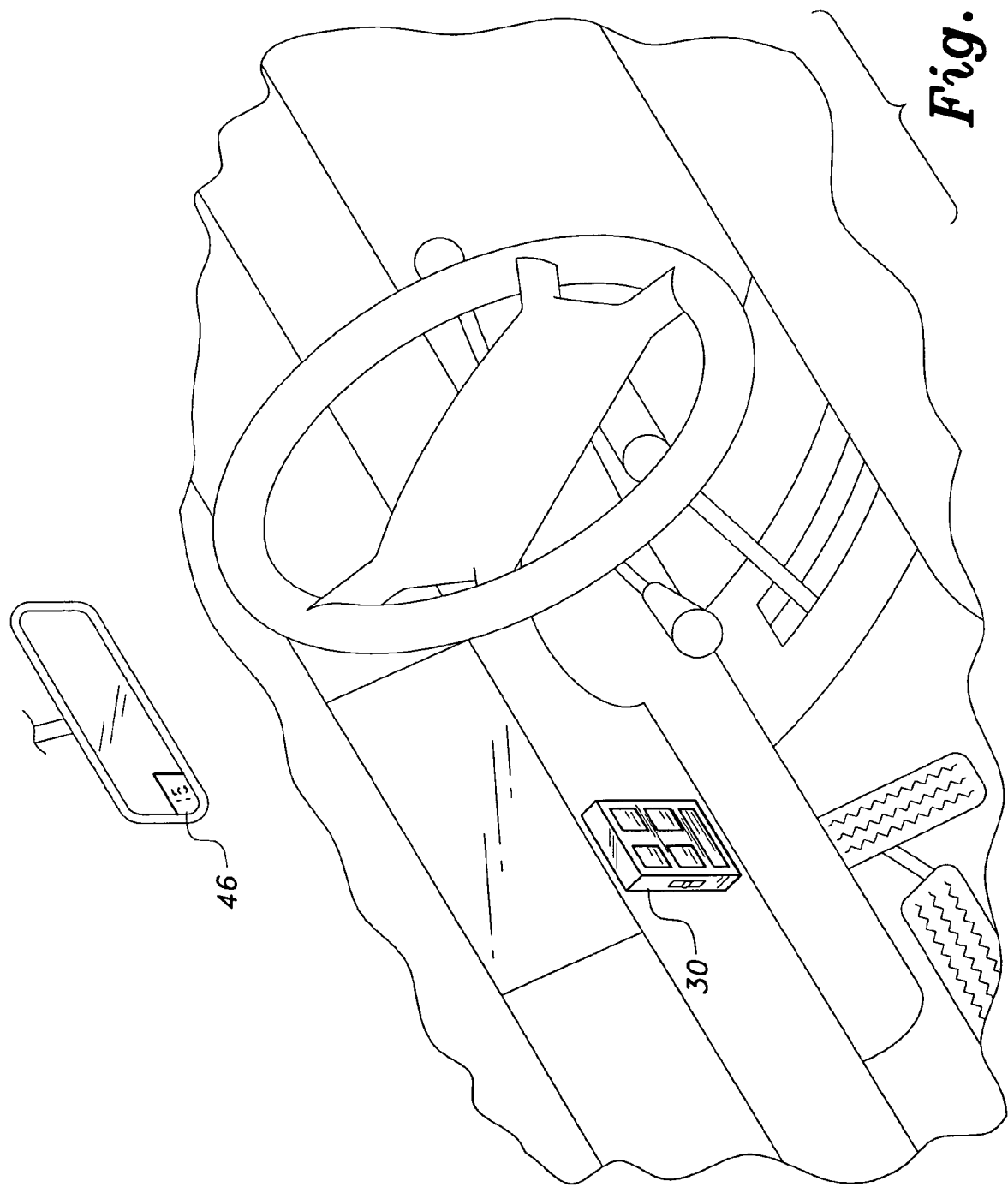
FIG. 2A is an environmental, perspective view of the remote control and distance display components of the digital message display for vehicles according to the present invention.
Figure 2B:
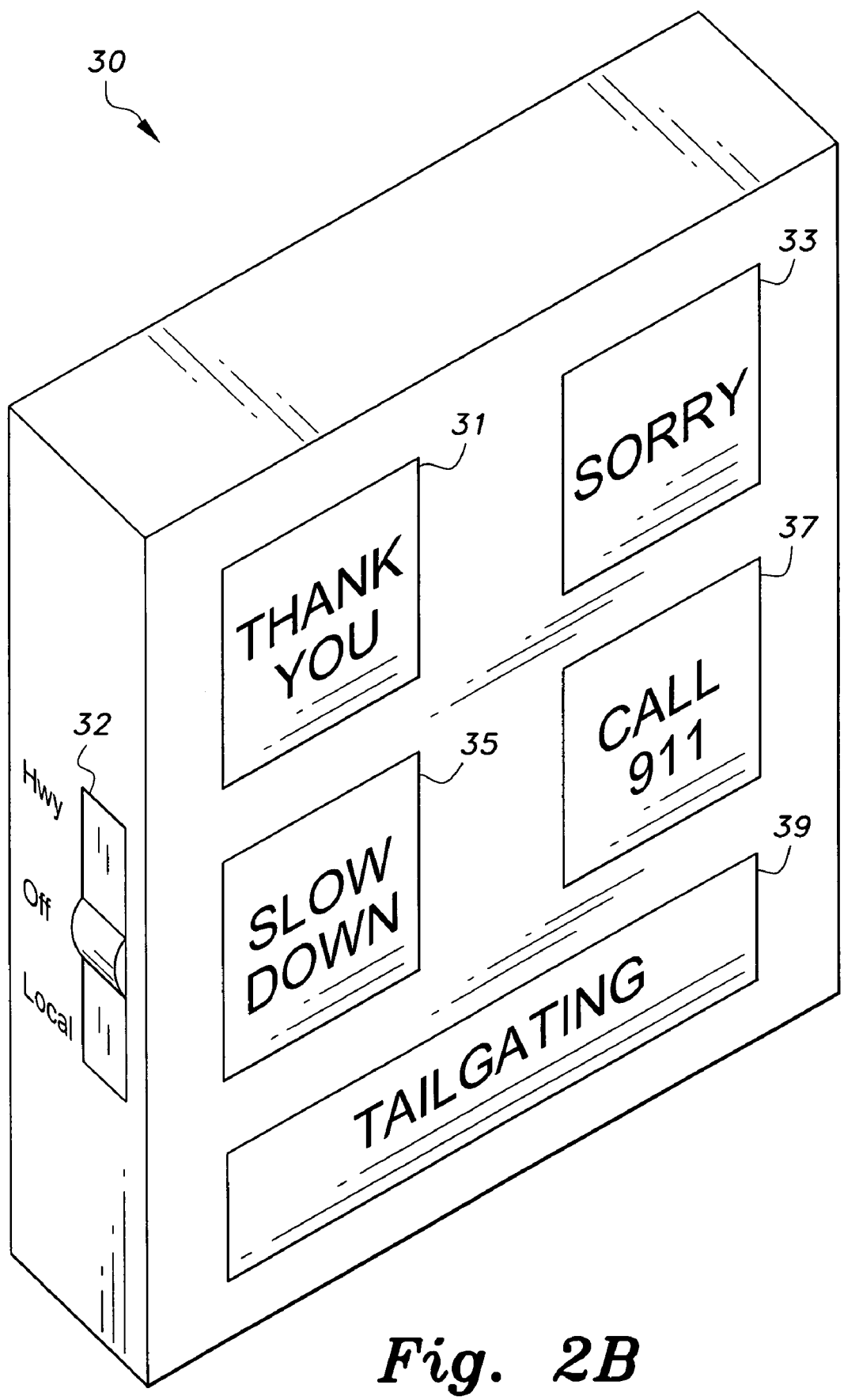
FIG. 2B is a perspective view of the remote control shown in FIG. 2A.

As shown in FIG. 2A, the digital message display for vehicles includes a distance display 46 that displays the distance between the vehicle and the tailgater. A remote control 30 allows the driver to control the operation of the digital message display for vehicles, such as to select a mode of operation or to manually display additional safety and courtesy messages. Referring to FIG. 2B, a switch 32 is shown more clearly for selecting between a highway and a local mode of operation.

Figure 3:
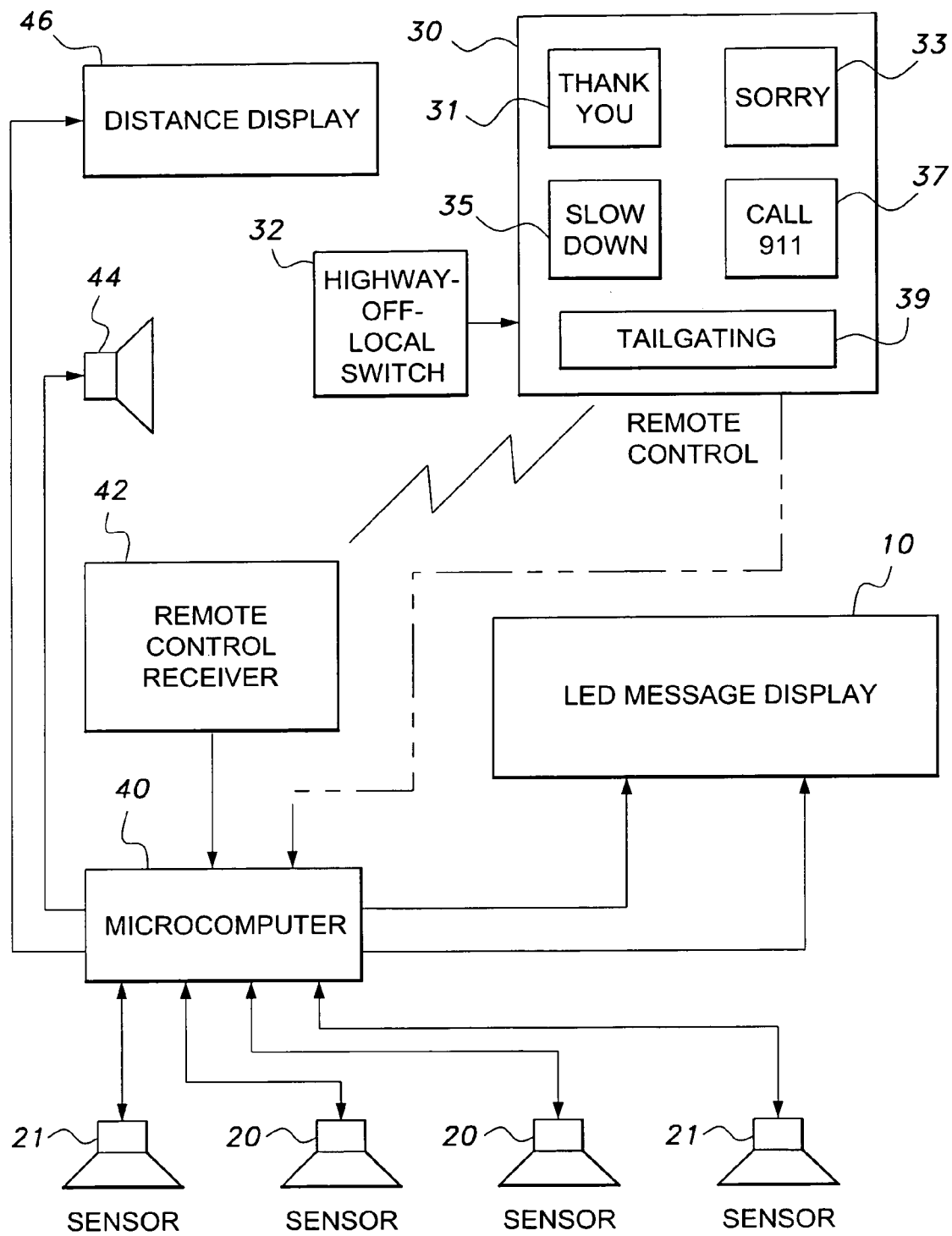
FIG. 3 is a block diagram of the message display for vehicles according to the present invention.

Referring now to FIG. 3, a microcomputer 40 is shown in electrical connection with a pair of distance sensors 20 and with the message display 10. The microcomputer 40 is one of a type well known in the art that contains a memory and program storage means. A microcomputer program is contained in the microcomputer 40. The microcomputer program functions to read the distance sensors to determine the distance to a tailgating vehicle. In the illustrated embodiment, the microcomputer program reads the first and second pairs of distance sensors 20, 21, although it can be understood that a single pair of distance sensors may be employed to provide similar functions using a single distance range.

When the microcomputer program determines that a tailgating vehicle is present and closer than a predetermined safety threshold, the microcomputer 40 causes a warning message to be displayed on the message display 10. A textual message such as "TAILGATING!" flashes on the message display 10 to alert the tailgating driver. The microcomputer program may operate in a local mode or in a highway mode, depending on the position of the switch 32.

In the local mode, the microcomputer program employs primarily the first pair of distance sensors 20 to monitor trailing vehicles within the vicinity of the short range distance d1, at relatively close distances associated with slower driving speeds. In the highway mode, the microcomputer program employs primarily the second pair of distance sensors 21 to monitor trailing vehicles within the vicinity of the long range distance d2, at greater distances associated with driving at higher speeds. The microcomputer 40 may be in communication with the vehicle's speedometer, or another device for measuring the actual velocity of the vehicle to compensate, or adjust, threshold levels for activating a tailgating message. When the vehicle is stopped, or parked for example, a very low distance threshold may be employed to indicate a different message, such as a collision warning.

Additionally, a distance display 46 may be electrically connected to the microcomputer 10. When the microcomputer program determines that a tailgater is present, the distance between the vehicle and the tailgater is displayed on the distance display 46. In the illustrated embodiment, the distance display 46 is disposed in the vehicle's rear-view mirror. A beeper 44, also in connection with the microcomputer 40, emits an audible alarm to alert the driver to the tailgater's presence.

The remote control 30 may communicate with the remote control receiver 42 over a wired connection or by a wireless means such as by infrared or RF. In the case of the wired connection, the remote control 30 may communicate directly with the microcomputer 40. In the case of a wireless interface, the remote control 30 communicates with a remote control receiver 42 that is in electrical connection to the microcomputer. 40. In a wireless embodiment, the remote control 30 transmits an RF signal that is received by the remote control receiver 42. The remote control 30 has a plurality of pushbuttons 31, 33, 35, 57, and 39. When one of the pushbuttons 31, 33, 35, 57, 39 is depressed, a signal is transmitted to the remote control receiver 42, which in turn communicates the signal to the microcomputer 40. The microcomputer program will cause the message display 10 to display a unique predetermined message for each pushbutton that is depressed. In the embodiment illustrated, pushbutton 31 will cause the message "THANK YOU" to be displayed; pushbutton 33 displays "SORRY"; pushbutton 35 shows "SLOW DOWN"; pushbutton 37 shows "CALL 911"; and pushbutton 39 shows "TAILGATING". Other messages could be pre-programmed in the microcomputer, but it is not intended that the messages are customizable by the users of the digital message display for vehicles.

Figure 4:
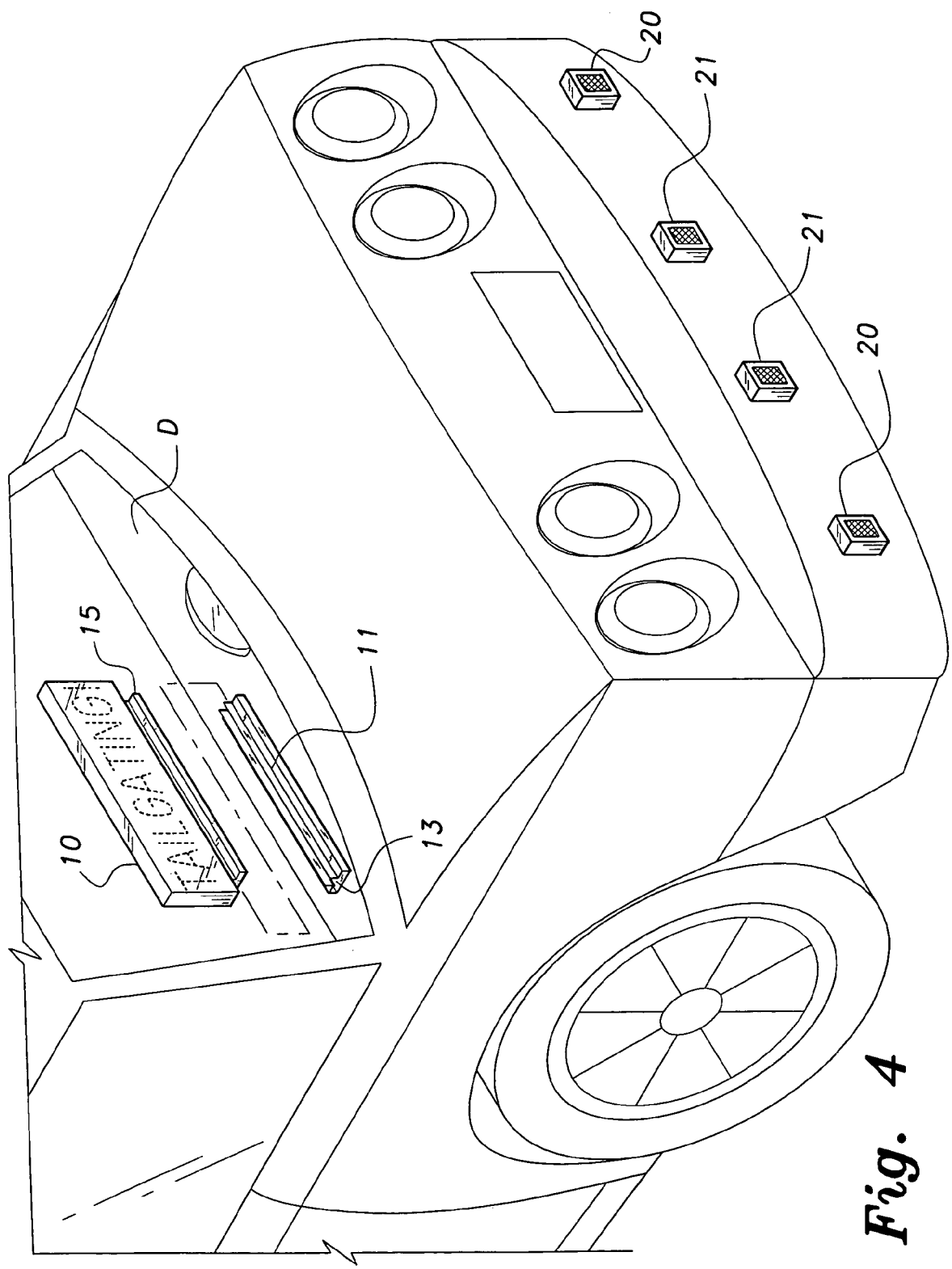
FIG. 4 is an environmental, perspective view showing a method of mounting a digital message display for vehicles according to the present invention.

Turning now to FIG. 4, a method for removably mounting the message display 10 within a vehicle is shown. An elongated slide track 11, having a "T" channel 13 defined lengthwise therein, is mounted to a rear deck D of the vehicle, adjacent to the rear window. An elongated "T" slide member 15 is fastened to the bottom of the message display 10. The message display 10 is mounted in place by engaging the "T" slide member 15 with the "T" channel 13 of the slide track 11.

Figure 5:
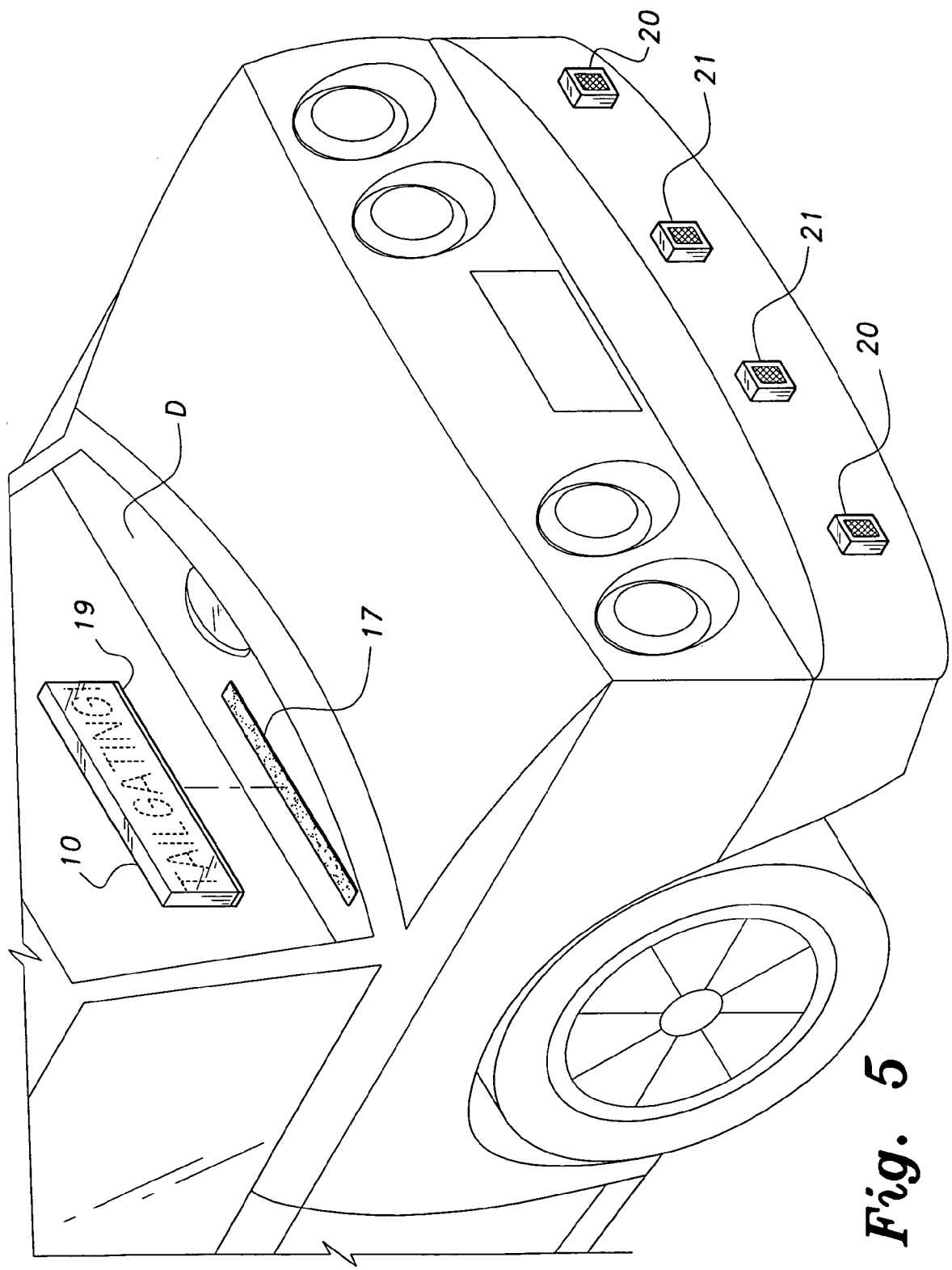
FIG. 5 is an environmental, perspective view showing an alternate method of mounting a digital message display for vehicles according to the present invention.

Referring to FIG. 5, the message display 10 is shown removably mounted to the rear deck D of a vehicle with a hook and lop fastener. A first component 17 of a hook and loop fastener is affixed to the rear deck D of the vehicle, and a second mating component 19 of the hook and loop fastener is affixed to the bottom of the message display 10. The message display 10 may be held in place on the rear deck D of the vehicle by simply mating together the first and second components 17, 19 of the hook and loop fastener.

Figure 6:
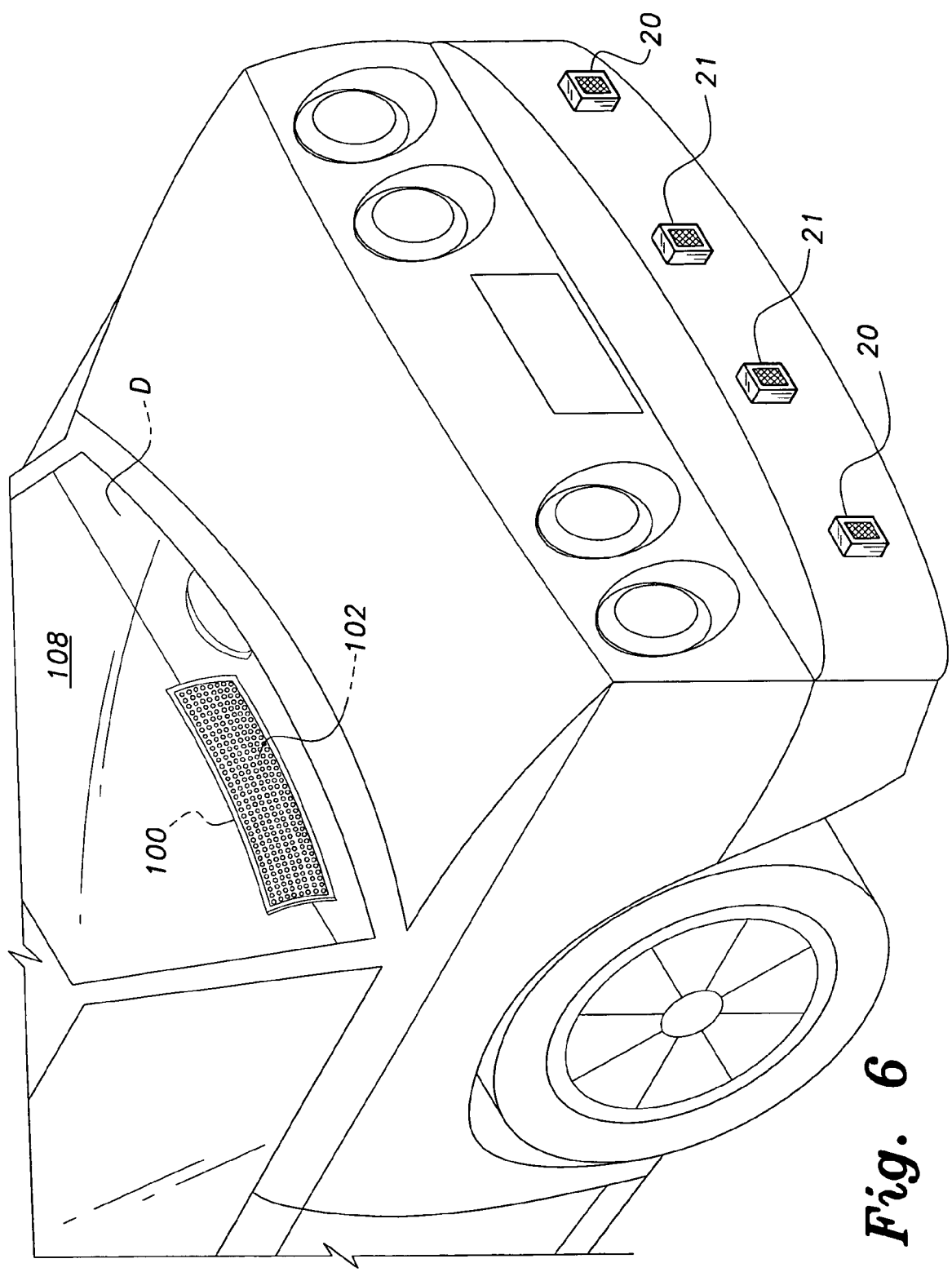
FIG. 6 is a perspective view of a second embodiment of a message display in a digital message display for vehicles according to the present invention.
Figure 7:
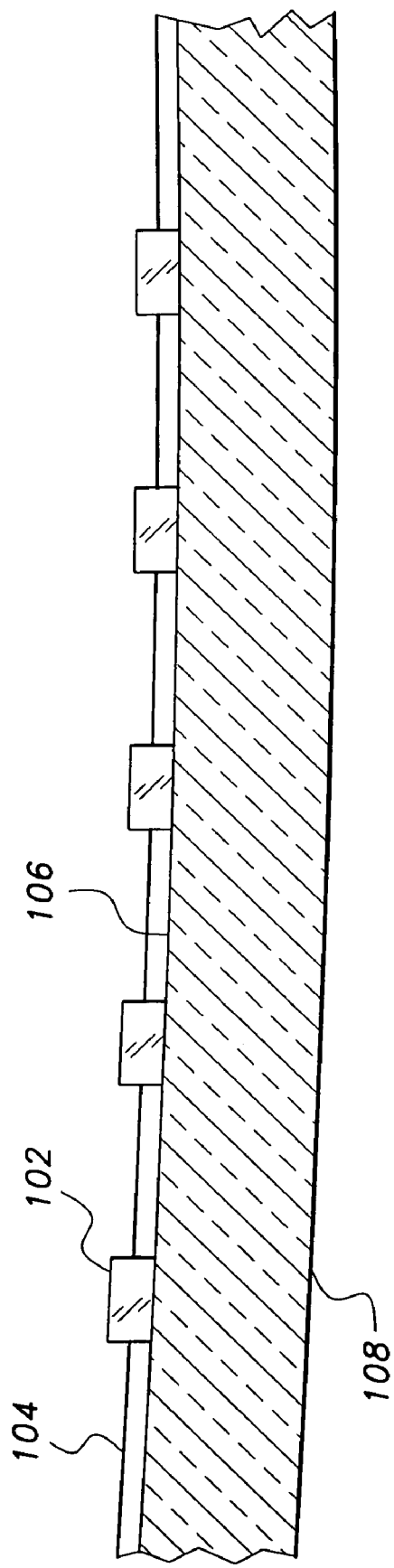
FIG. 7 is a cutaway view of the message display shown in FIG. 6.

Turning now to FIGS. 6 and 7, an alternative message display 100 is fashioned on or within a vehicle rear window 108 itself, eliminating the requirement to mount a separate unit on the vehicle rear deck D. The message display 100 comprises an array of Light Emitting Diodes (LEDs) 102 disposed on the inside surface 106 of, or embedded within, the vehicle rear window 108. The LEDs 102 are interconnected by electrical traces 104 formed on the inside surface 106 of the vehicle rear window 108 to form an alpha-numeric display. In the illustrated embodiment, the LEDs are arranged to form a dot-matrix type of alpha-numeric display.

It is to be understood that the present invention is not limited to the embodiments described above, but encompasses any and all embodiments within the scope of the following claims.

I claim:

1. A digital message display for vehicles comprising:
   a message display capable of displaying short textual messages;
   at least one short range distance sensor having a first sensing range, the at least one short range distance sensor being adapted for mounting to a rear surface of a vehicle;
   at least one long range distance sensor having a second sensing range, the second sensing range being greater than the first sensing range, the at least one long range distance sensor being adapted for mounting to the rear surface of the vehicle;
   a microcomputer in electrical connection with said message display and with said at least one vehicle distance sensor; and
   a computer readable program code contained in said microcomputer, the program code having means for selectively reading a trailing vehicle distance from either of said at least one short range distance sensor or said at least one long range distance sensor, means for determining when the trailing vehicle distance falls below a safety threshold, and means for selectively displaying on said message display one of a plurality of predefined short textual messages when the trailing vehicle distance falls below said safety threshold.

2. The digital message display for vehicles according to claim 1, wherein said message display is a light emitting diode display capable of displaying short textual messages.

3. The digital message display for vehicles according to claim 1, wherein said at least one short range distance sensor and said at least one long range distance sensor each comprise a plurality of vehicle distance sensors.

4. The digital message display for vehicles according to claim 1, further comprising a beeper, the beeper being electrically connected to said microcomputer; and
   wherein the computer program code further comprises means for causing the beeper to generate an audible alarm when the trailing vehicle distance falls below the safety threshold.

5. The digital message display for vehicles according to claim 1, further comprising a numeric distance display, the numeric distance display being electrically connected to said microcomputer; wherein the computer program code has means to cause the numeric distance display to display said trailing vehicle distance.

6. The digital message display for vehicles according to claim 5, wherein said numeric distance display is disposed in a vehicle rear-view mirror.

7. The digital message display for vehicles according to claim 1, further comprising:
   a remote control in communication with said microcomputer, the remote control having a plurality of pushbuttons;
   wherein the computer program code further comprises means for selectively displaying on said message display one of a plurality of predefined short textual messages when one of said pushbuttons is pressed, there being a unique message for each said pushbutton.

8. The digital message display for vehicles according to claim 7, further comprising:
   a remote control receiver in communication with said remote control, the remote control receiver being electrically connected to said microcomputer.

9. The digital message display for vehicles according to claim 7, wherein;
   said remote control further comprises a mode switch having at least a first position and a second position; and
   wherein the computer program code further comprises means for setting said safety threshold to a first distance when said mode switch is in said first position and setting said safety threshold to a second distance when said mode switch is in said second position.

10. The digital message display for vehicles according to claim 3, wherein said at least one short range distance sensor and said at least one long range distance sensor are positioned in a linear array on a rear bumper of the vehicle.

11. The digital message display for vehicles according to claim 10, further comprising means for selecting between a first operating mode and a second operating mode.

12. The digital message display for vehicles according to claim 1, wherein the computer program code further comprises means for operating in said first operating mode to read said trailing vehicle distance from said at least one short range distance sensor, and operating in said second operating mode to read said trailing vehicle distance from said at least one long range distance sensor.

13. The digital message display for vehicles according to claim 1, further comprising means for mounting said message display to a rear deck of a vehicle.

14. A vehicle with a digital message display comprising:
   a vehicle having a rear bumper;
   a message display capable of displaying short textual messages;
   at least one short range distance sensor having a first sensing range, the at least one short range distance sensor being mounted to the rear bumper of the vehicle;
   at least one long range distance sensor having a second sensing range, the second sensing range being greater than the first sensing range, the at least one long range distance sensor being mounted to the rear bumper of the vehicle;
   a microcomputer in electrical connection with said message display and with said at least one vehicle distance sensor; and
   a computer readable program code contained in said microcomputer, the program code having means for reading a trailing vehicle distance from either of said short range distance sensor and said long range distance sensor, means for determining when the trailing vehicle distance falls below a safety threshold, and means for selectively displaying on said message display one of a plurality of predefined short textual messages when the trailing vehicle distance falls below said safety threshold.

15. The vehicle with a digital message display according to claim 14, further comprising:
   a remote control in communication with said microcomputer, the remote control having a plurality of pushbuttons;
   wherein the computer program code further comprises means for selectively displaying on said message display one of a plurality of predefined short textual messages when one of said pushbuttons is pressed, there being a unique message for each said pushbutton.

16. The vehicle with a digital message display according to claim 15, wherein said remote control further comprises means for selecting between a first operating mode and a second operating mode.

17. The vehicle with a digital message display according to claim 16, wherein the computer program code further comprises means for operating in said first operating mode to read said trailing vehicle distance from said short range distance sensor, and operating in said second operating mode to read said trailing vehicle distance from said long range distance sensor.

18. The vehicle with a digital message display according to claim 14, wherein said message display comprises:
   a vehicle rear window having an interior surface;
   a plurality of LEDs disposed on said interior surface; and
   a plurality of electrical traces disposed on said interior surface and interconnecting said LEDs.

19. The vehicle with a digital message display according to claim 18, wherein said LEDs are arranged to form a dot-matrix alpha-numeric display.

20. The vehicle with a digital message display according to claim 14, wherein said at least one short range distance sensor and said at least one long range distance sensor are positioned in a linear array on the rear bumper of the vehicle.

\* \* \* \* \*